US010673033B2

(12) United States Patent
Mille et al.

(10) Patent No.: US 10,673,033 B2
(45) Date of Patent: Jun. 2, 2020

(54) GASKET AND DIAPHRAGM FOR ELECTROCHEMICAL CELL

(71) Applicant: TESLA, INC., Palo Alto, CA (US)

(72) Inventors: Christophe Mille, Redwood City, CA (US); Kunio Tsuruta, Mountain View, CA (US); Kenjin Masumoto, Santa Clara, CA (US)

(73) Assignee: Tesla, Inc., Palo Alto, CA (US)

( * ) Notice: Subject to any disclaimer, the term of this patent is extended or adjusted under 35 U.S.C. 154(b) by 388 days.

(21) Appl. No.: 15/244,663

(22) Filed: Aug. 23, 2016

(65) Prior Publication Data

US 2017/0062778 A1    Mar. 2, 2017

Related U.S. Application Data

(60) Provisional application No. 62/209,145, filed on Aug. 24, 2015, provisional application No. 62/209,163, filed on Aug. 24, 2015.

(51) Int. Cl.
*H01M 10/052* (2010.01)
*H01M 2/04* (2006.01)
(Continued)

(52) U.S. Cl.
CPC ......... *H01M 2/0439* (2013.01); *H01M 2/024* (2013.01); *H01M 2/027* (2013.01); *H01M 2/046* (2013.01); *H01M 2/0413* (2013.01); *H01M 2/0482* (2013.01); *H01M 2/0486* (2013.01); *H01M 2/1241* (2013.01); *H01M 10/052* (2013.01); *H01M 2220/20* (2013.01);
(Continued)

(58) Field of Classification Search
CPC ....................... H01M 10/052; H01M 10/0525
See application file for complete search history.

(56) References Cited

U.S. PATENT DOCUMENTS

| | | | |
|---|---|---|---|
| 3,939,011 A | 2/1976 | Zaleski | |
| 4,725,515 A * | 2/1988 | Jurca | H01M 2/0413 29/623.1 |

(Continued)

FOREIGN PATENT DOCUMENTS

| | | |
|---|---|---|
| JP | 02-288063 | 11/1990 |
| JP | 2006128121 | 5/2006 |
| WO | 2010136387 | 12/2010 |

OTHER PUBLICATIONS

International Searching Authority; International Search Report and Written Opinion; International Application No. PCT/US2016/048262; dated Oct. 28, 2016; 9 pgs.

*Primary Examiner* — Olatunji A Godo
(74) *Attorney, Agent, or Firm* — Knobbe, Martens, Olson & Bear, LLP

(57) ABSTRACT

An electrochemical cell includes a can configured to serve as one electric contact of the electrochemical cell, the can containing active materials, a diaphragm configured to serve as an opposite electric contact of the electrochemical cell, and a gasket that is initially of generally cylindrical shape, the diaphragm positioned inside the gasket in an opening of the can wherein an outer edge of the can is crimped onto the gasket, the gasket having an inner periphery inside the can and an outer periphery outside the can, the outer periphery comprising leaves that after crimping extend along an outer surface of the diaphragm.

14 Claims, 12 Drawing Sheets

(51) Int. Cl.
*H01M 2/02* (2006.01)
*H01M 2/12* (2006.01)

(52) U.S. Cl.
CPC ............. *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 4,828,939 A * | 5/1989 | Turley | H01M 4/8626 429/403 |
| 2010/0136387 A1 | 6/2010 | Kohn et al. | |
| 2013/0059181 A1 | 3/2013 | Leport et al. | |
| 2013/0236757 A1 * | 9/2013 | Tikhonov | H01M 2/0257 429/94 |

* cited by examiner

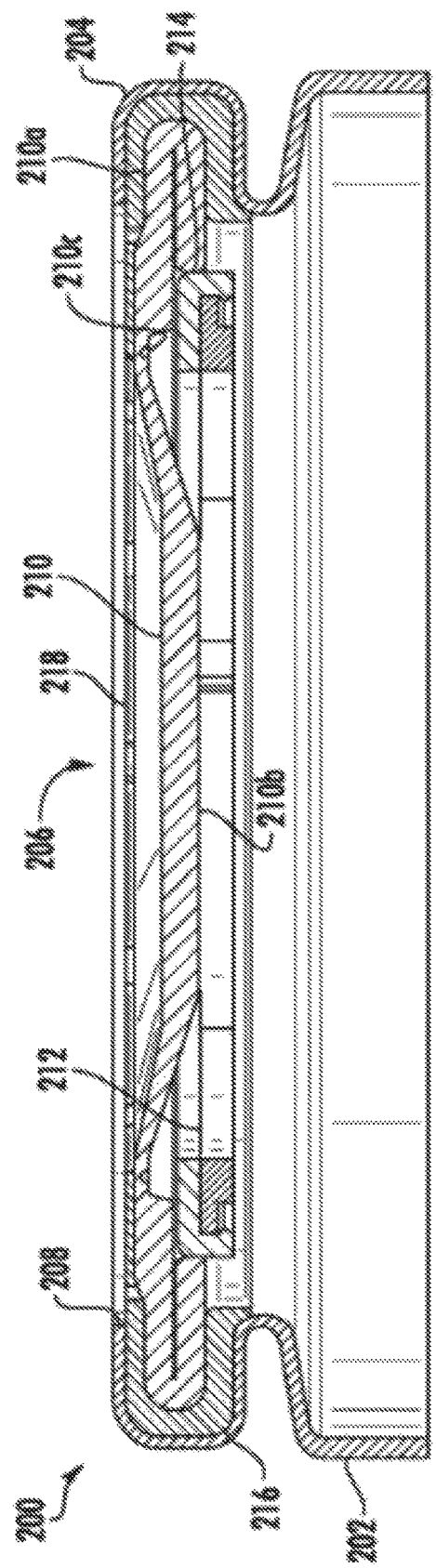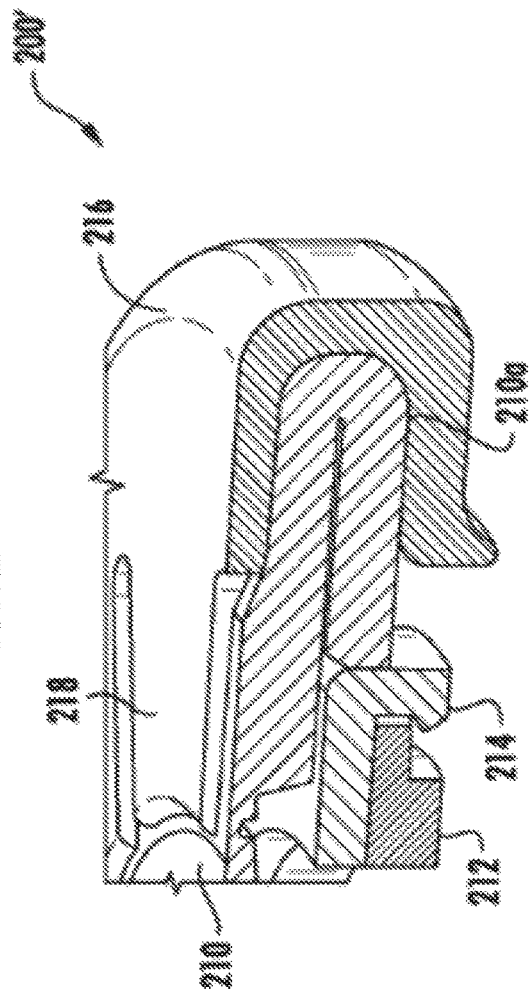
FIG. 2
FIG. 2A

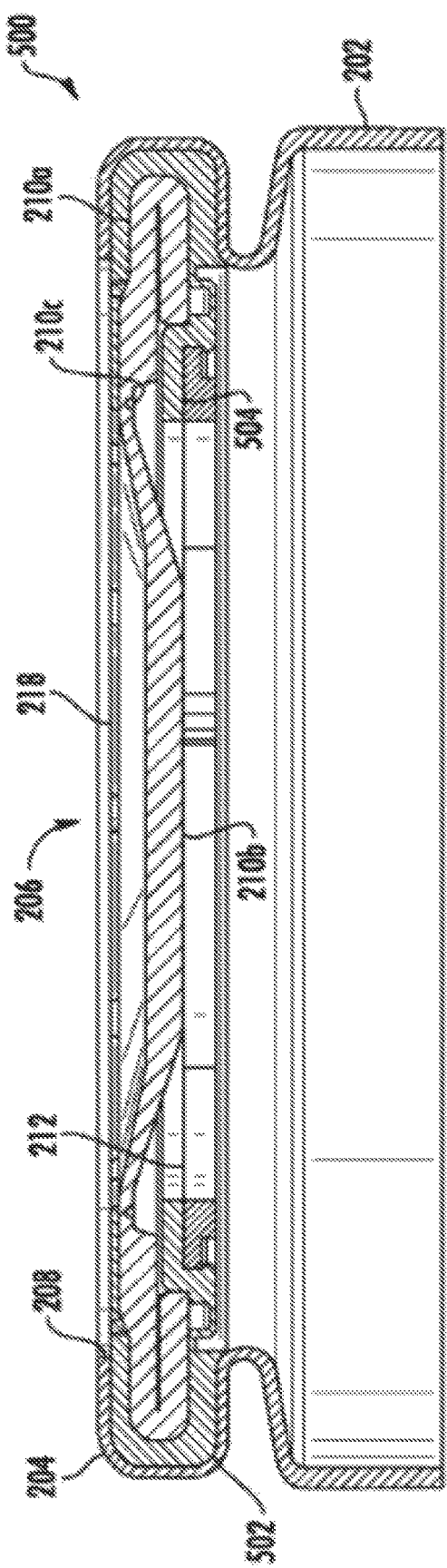
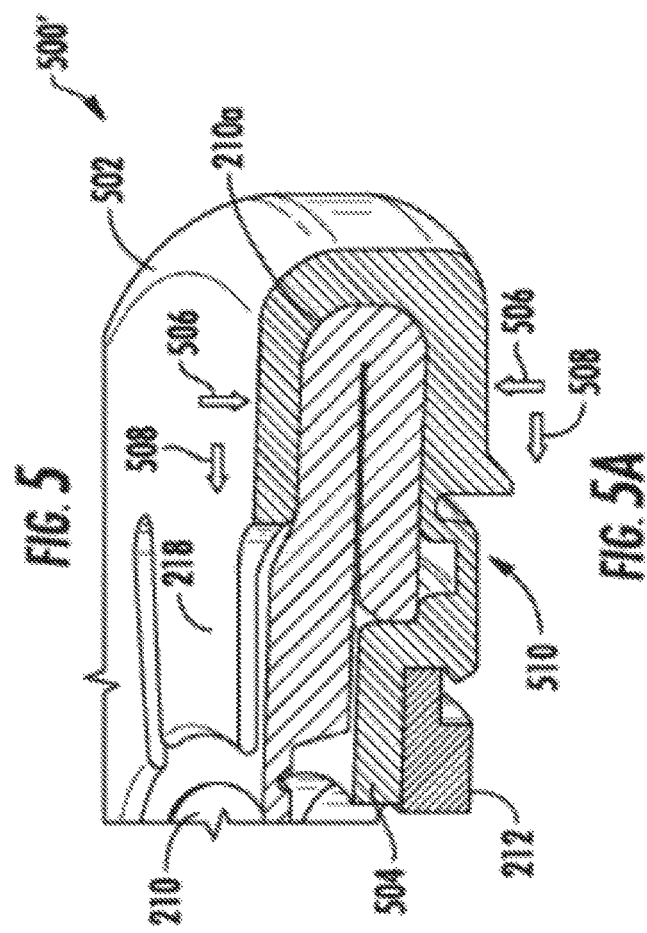
FIG. 5
FIG. 5A

GASKET AND DIAPHRAGM FOR ELECTROCHEMICAL CELL

CROSS REFERENCE TO RELATED APPLICATIONS

The present U.S. Utility Patent Application claims priority pursuant to 35 U.S.C. § 119(e) to U.S. Provisional Application No. 62/209,145, filed 24 Aug. 2015, entitled "Gasket for Electrochemical Cell" and to U.S. Provisional Application No. 62/209,163, filed 24 Aug. 2015, entitled "Diaphragm for Electrochemical Cell," both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates in general to batteries, and more particularly to the structure and components of electrochemical battery cells (cells).

Description of Related Art

Lithium ion cells are one type of electrochemical cells. A lithium ion cell generally includes active materials (an anode and a cathode) and electrolyte. These materials are enclosed in a housing that in some cases is cylindrical and is sometimes referred to as a can. The can has an opening that is closed with a cap, sometimes referred to as the top cap. The cap can be sealed using a gasket. The construct of these cells must be durable and cost effective. In some applications, such as those for electric vehicles, thousands of cells are formed into an array that, in combination, provide electrical energy to propel the vehicle. Because of the number of cells in such an array, the cells must be inexpensive to produce, provide as much electrical storage capacity as possible for their size and weight, and must be durable to support a long life span. Incremental improvements in cell weight, cost, size, and storage capacity provide significant benefits for electric vehicles, among other applications.

BRIEF DESCRIPTION OF THE SEVERAL VIEWS OF THE DRAWING(S)

FIG. 2 illustrates a cross section of a first example of a cell.

FIG. 2A illustrates a perspective view of a portion of the cell of FIG. 2.

FIG. 5 illustrates a cross section of a second example of a cell.

FIG. 5A illustrates a perspective view of a portion of the cell of FIG. 5.

DETAILED DESCRIPTION OF THE INVENTION

This document describes examples of improved electrochemical cells and components thereof. In some implementations, the electrochemical cell has a gasket sealing its top cap and this gasket has a crown-like appearance with leaves or other extensions that after installation spread onto the upper center surface of the cell, which is usually the place where the positive contact is attached. For example, when the installation is done so that the negative contact is also attached on the top of the cell, albeit on the can material and not the top cap, such a gasket can provide the advantage of reducing the likelihood of a short circuit between the negative contact and the positive terminal.

A diaphragm formed in a cell's top cap serves as part of current interruption device (CID) functionality and also has material weakening that facilitates venting in case of a significant rise in internal pressure due to overheating or other type of cell failure. The diaphragm may advantageously be manufactured from a single piece of material and may be formed into its final shape by way of a few operations. Such a diaphragm can have the advantage that it provides sufficient thickness at its periphery to withstand crimping, while allowing the material weakening to be formed in a relatively easy fashion.

In some implementations, the cap is designed to serve as the positive terminal of the cell. The diaphragm can therefore be made from an electrically conductive material, whereas the gasket can be made from an insulating material. The diaphragm can then be directly or indirectly connected to a cathode in the active materials of the cell. For example, one or more electrical interconnects may include, but are not limited to, a wire-bond may be created on the outside surface of the diaphragm to establish the positive connection to and from the cell.

The present description relates to of electrochemical cells, which may include, but are not limited to, lithium-ion cells. In general, such cells have a housing (sometimes in the form of a can) to hold the active materials with the housing closed off by what is usually referred to as a top cap. However, the top, bottom and sides of an electrochemical cell may usually be defined somewhat arbitrarily. This description will therefore broadly refer to a cap that closes an opening in the can, without limitation as to where on the cell the opening is located. For this reason, any mention of top or bottom herein is exemplary only. Also, cylindrical form factors are often used, but other shapes of cell housings can be used in some implementations.

Figure 1:
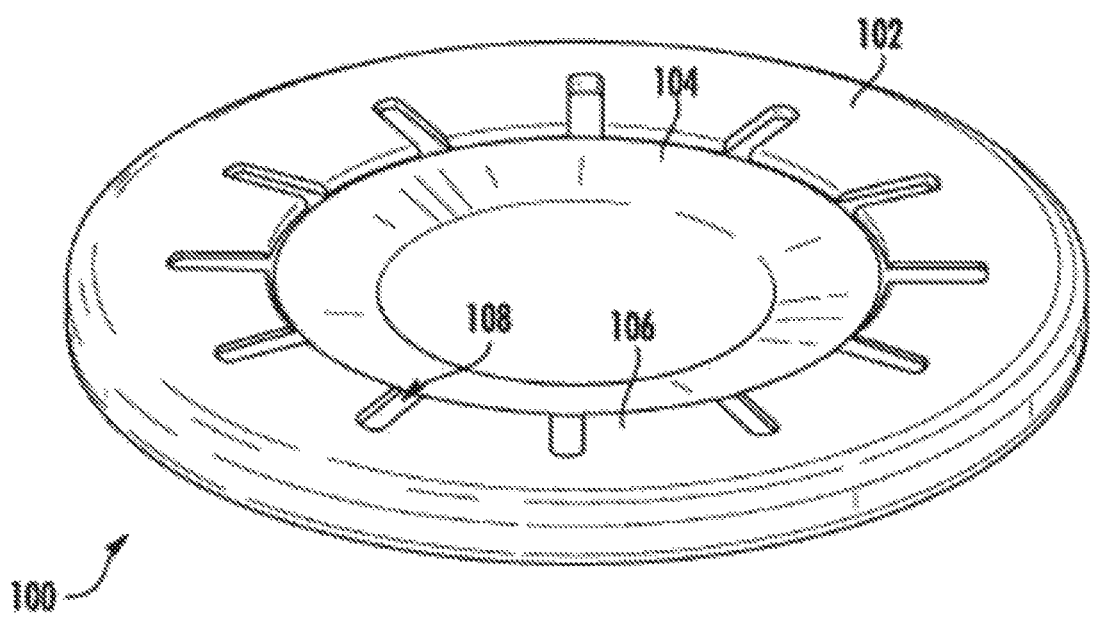
FIG. 1 illustrates an example of a cap for a cell.

FIG. 1 shows an example of a cap 100 for a cell. The cap has a gasket 102 that encloses an outer edge of a diaphragm 104. Other components can be part of a cap but are not shown or described here for simplicity. The cap is designed to close off an opening of a can or other housing for an electrochemical cell. Such closing provides a seal that prevents or restrains fluids from exiting the cell (e.g., as a leak of electrolyte) or from entering into the cell (e.g., as a contaminant).

Also, the shown configuration of the cap can represent the shape it has following a crimping operation. Such crimping can be performed once the cap has been placed in the can opening, but the can is here not shown for clarity. In some implementations, the cap is designed to serve as the positive terminal of the cell. The diaphragm can therefore be made from an electrically conductive material, whereas the gasket can be made from an insulating material. The diaphragm can then be directly or indirectly connected to a cathode in the active materials of the cell. For example, one or more electrical interconnects (not shown)—including, but not limited to, a wire bond may be created on the outside surface of the diaphragm to establish the positive connection to and from the cell.

The gasket here has leaves 106. In some implementations, the leaves 106 are created as part of manufacturing the gasket. The leaves are separated by slots 108. In some implementations, the leaves 106 are shaped so that after crimping, adjacent leaves 106 are separated by a slot formed by essentially parallel edges. For example, before the crimping and before the gasket takes on its current appearance, the slots 108 may have different shapes.

The leaves and the slots between them may seek to provide the gasket with a more even surface when lying against the top surface of the diaphragm. For example, wrinkling and creasing of the gasket should be avoided. This can be expressed as a relationship between the lengths of the outer edges of the leaves 106 and the exposed surface of the diaphragm. For example:

$$ID*\pi \geq L_1 + L_2 + \ldots + L_N$$

wherein

ID=inner diameter of exposed diaphragm area

Li=length of the outer edge of leaf i (where i=1, 2, . . . , N, and N is the number of leaves 106)

FIG. 2 shows a cross section of a first example of a cell 200. The cell has a can 202, only part of which is shown here for clarity, which is configured to hold therein the active materials of the cell. For example, this can include a so-called jelly roll of anode and cathode substrates, and a liquid electrolyte. The can may have any suitable shape, including, but not limited to, a cylinder shape. The can 202 may be intended to serve as one of the electrical terminals, e.g., the negative one for the cell.

The can 202 has a shoulder 204 near one of its ends. In some implementations, the shoulder 204 is created as part of crimping the end of the cell in order to seal off the inside of the cell from the outside. Here, an essentially circular opening 206 exists after the crimping, the opening defined by an edge 208 of the can material. In some implementations, the shoulder 204 is the intended location for attachment of an electrical terminal to the cell.

The cell has a diaphragm 210, such as an essentially circular element. In some implementations, the diaphragm 210 has a crimping portion 210A, a central area 210B, and a score 210C that extends at least partially around the diaphragm 210. The diaphragm 210 can serve one or more purposes for cell operation. First, as mentioned, the diaphragm can be part of an electrical terminal for the cell. For example, when the can 202 serves as the negative terminal, the diaphragm 210 can be the positive electrical terminal. Second, the diaphragm 210 may serve to close off the can 202 interior to prevent leakage and contamination. Third, in the event of increasing internal pressure the diaphragm 210 may pop up and thereby facilitate a CID operation. Fourth, if pressure increases inside the can 202, which occurs, e.g., in the event of an unwanted reaction in the cell, such as a thermal runaway, the diaphragm 210 can rupture and thereby allow fluid to escape out of the cell, essentially facilitating ventilation of the cell. For example, the score 210C or another material weakening can facilitate rupturing of the diaphragm.

The cell has a rupture plate 212 that can be attached directly to the diaphragm 210. The rupture plate 212 serves one or more purposes in facilitating rupturing of the diaphragm. 210. For example, the rupture plate 212 may control a load that bears on the inside of the diaphragm 210 during rising pressure and thereby control when rupturing occurs and the pattern of the rupturing. The cell here has an insulator 214 positioned at least partly in between the rupture plate 212 and the diaphragm 210. In some implementations, the insulator 214 may be an essentially circular element.

The cell has a gasket 216 that serves to hold the cap in place, seal in the contents of the can 202, and reduce or eliminate short circuiting during the manufacturing process. For example, the gasket 216 seals between the diaphragm 210 and an opening of the can 202. As another example, the gasket 216 protects against short circuiting during interconnect welding. The gasket 216 has a number of leaves 218 that, after crimping, are positioned on top of the diaphragm 210. The leaves 218 can prevent unwanted accumulation of gasket material after the cell is crimped. For example, the leaves 218 can reduce the occurrence of undesirable waves, folds or bunching that might otherwise occur as the gasket material on top of the diaphragm is compressed in the crimping process.

FIG. 2A shows a perspective view of a portion 200' of the cell 200 in FIG. 2. Here, the can has been omitted for clarity. As such, the illustration shows the gasket 216 covering the crimping portion 210A of the diaphragm 210, the leaf 218 extending over part of the upper surface of the diaphragm 210, and the insulator 214 between the diaphragm 210 and the rupture plate 212. In particular, the crimping portion 210A includes a folded-back portion that essentially doubles the thickness of the diaphragm 210 in that place. For example, this can 202 serves to make the crimping and/or sealing more effective. Also, this design has the insulator 214 being a separate part from the gasket 216, meaning that it is manufactured separately and can be installed in a different stage of the process than the gasket 216.

Figure 3:
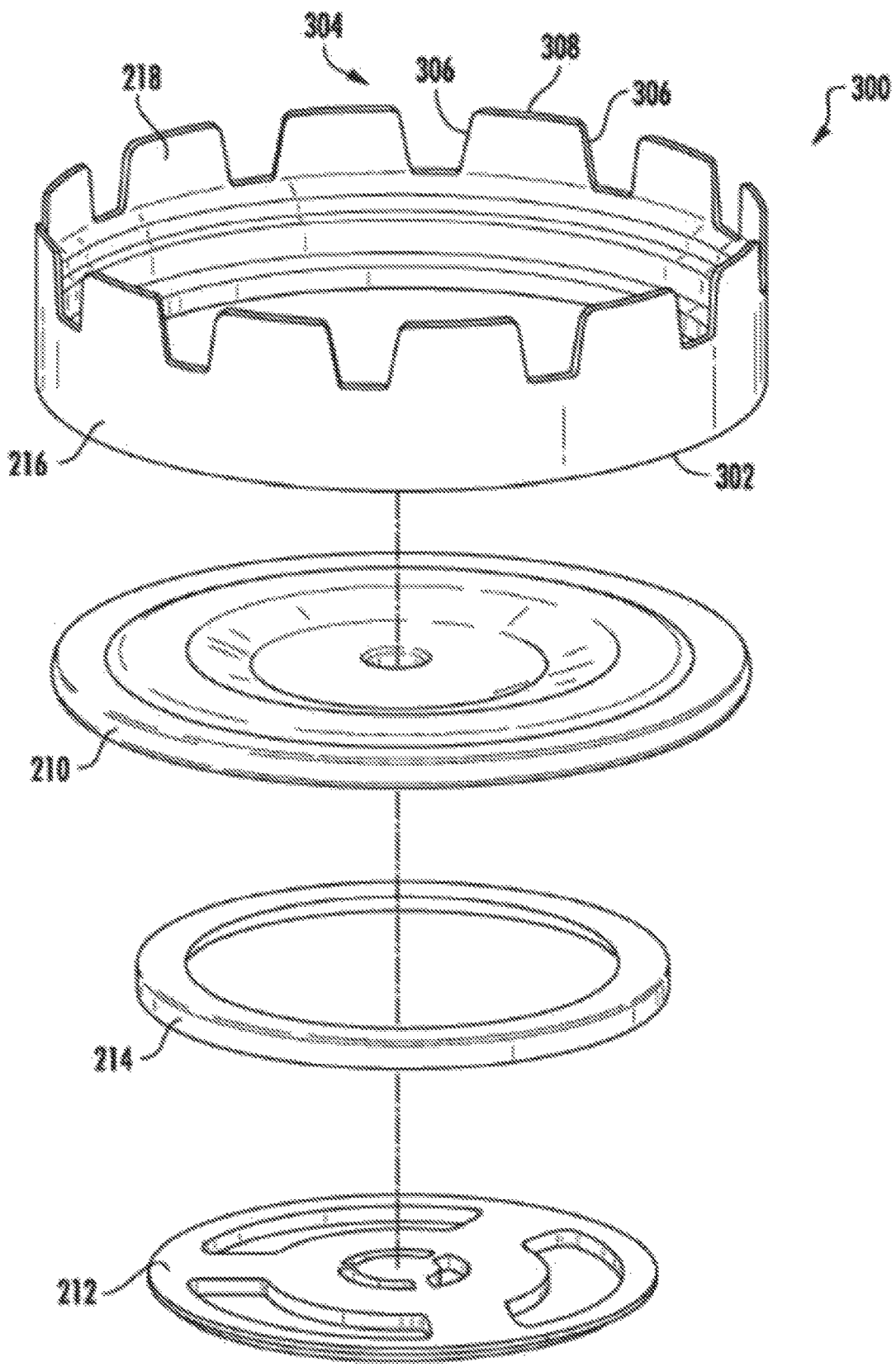
FIG. 3 illustrates examples of components of the cell of FIG. 2.

FIG. 3 shows examples of components 300 for the cell 200 in FIG. 2. The components are shown separately for clarity. That is, this example illustrates how some of the components can appear before the final assembly into a cap for a cell. For example, the gasket 216, which is here shown at the top for emphasis, can be the lowermost of these four components and the three other elements (210, 214, 212) can then be inserted into the gasket 216 from above. During such assembly, one or more of the components can change appearance, for example as described herein. As another example, one or more of the components may have been processed before assuming the shown appearance, such as that the diaphragm may have had its outer edge folded over itself so as to form a crimping portion 210A.

The gasket 216 in this example is formed as an essentially cylindrical body. The gasket 216 here has a first periphery 302 that in some implementations is an edge extending around the body of the gasket 216. The first periphery 302 is intended to be on the inside of the can after assembly. A second periphery 304 of the gasket 216, on the other hand, in intended to be outside the can 202 after the cell is manufactured. Here, the leaves 218 are formed at the second periphery to serve as protection against short circuits after assembly. For example, the leaves can be equidistantly spaced from each other along the second periphery.

Each leaf 218 here includes a pair of side edges 306 separated by a top edge 308. In some implementations, the side edges 306 are slanted inward toward the top edge 308. For example, this design can seek to ensure that after the crimping, adjacent leaves 218 are separated by a slot formed by opposing side edges that are essentially parallel to each other. As another example, before the crimping the top edge 308 may be essentially parallel to the first periphery 302. The gasket 216 can be designed so that the top edges 308 satisfy the relationship with the inner diameter of the exposed diaphragm area, as described above.

The gasket 216 may be manufactured from any suitable material. In some implementations, the gasket is formed by injection molding. For example, the gasket can be made of a plastic material, including, but not limited to, polypropylene.

The diaphragm 210 is designed so as to fit inside the gasket 216 upon installation. In some implementations, the diaphragm 210 is cut from a metal sheet and stamped to produce the desired profile in its central portion, such as the one shown in FIG. 2. For example, the lower part of the crimping portion 210A (FIG. 2A) can initially be perpendicular to the main portion, and then the lower part can be bent or folded underneath the main part of the diaphragm so as to assume essentially the shape shown in FIG. 2A. The diaphragm 210 can be made from any suitable conductive material, including, but not limited to, aluminum.

The insulator 214 can fit between part of the rupture plate 212 and part of the diaphragm 210. In some implementations a separate insulator element is used. For example, the insulator 214 can have a substantially annular form with essentially an L-shaped cross section. The insulator 214 can be made of any suitable material, such as a plastic material, including, but not limited to, polypropylene.

The rupture plate 212 is positioned so that it faces the inward surface of the diaphragm. In some implementations, the rupture plate 212 has one or more openings. For example, the rupture plate 212 can have holes formed as circle segments, each having a particular radius. A tab (not shown) can be mounted on the rupture plate 212 to electrically connect the top cap assembly (e.g., the diaphragm) to an active material inside the can 202. For example, the tab connects the cathode layer to the rupture plate 212. When the diaphragm 210 pops up due to significant internal pressure, this can sever the tab or other electrical connection with the active material.

Figure 4A:
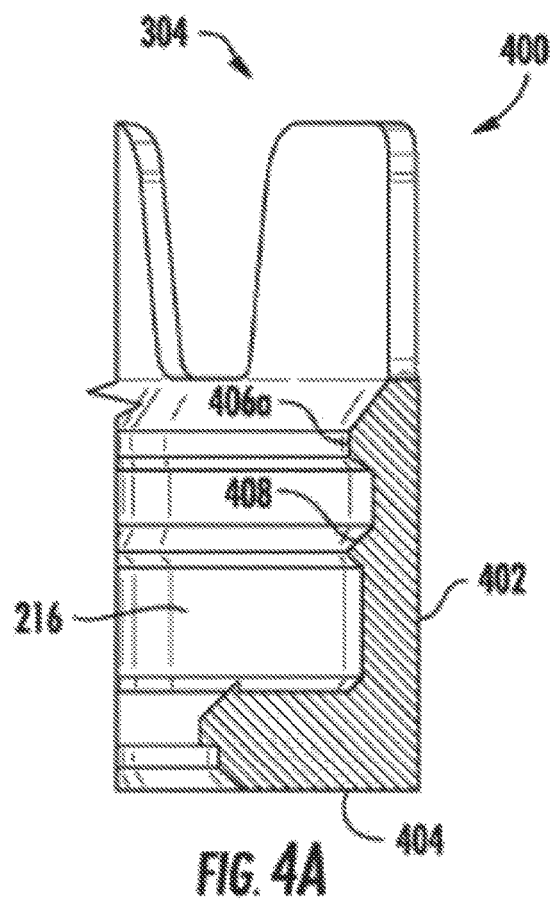
FIG. 4A illustrates an example cross section of a portion of a gasket of FIG. 3.

FIG. 4A shows an example of a cross section 400 of a portion of the gasket 216 in FIG. 3. In this example, the essentially cylindrical shape of the gasket 216 has a profile that includes portions 402 and 404. The portion 402 is initially substantially aligned with a length of the can, and the portion 404 is initially substantially perpendicular to the portion 402.

The portion 402 includes at least one first annular projection 406a that here faces inward. The portion 402 also includes a second annular projection 408. For example, the projection 408 can be configured to hold the diaphragm. The projection 406a can be positioned closer to the second periphery 304 than the projection 408 is. When the diaphragm has a thicker portion just inward of where the crimping portion 210A (FIG. 2A) ends, then the projection 406a may, upon crimping, abut an inclined portion that leads from the crimping area to the thicker portion. The projection 406a may have a polygonal or rounded shape, to name just two examples. In the crimping process, the projection 406a can reduce or eliminate the tendency for the portion of the shoulder 204 (FIG. 2) nearest the edge 208 (FIG. 2) to become crimped too much, such as to create a nonplanar and/or non-level surface. For example, when an electrical interconnect (e.g., the negative terminal) should be created onto the cell shoulder, then a non-planar or non-level surface can complicate the attachment process. Accordingly, the projection(s) 406a can reduce or eliminate such problems.

Figure 4B:
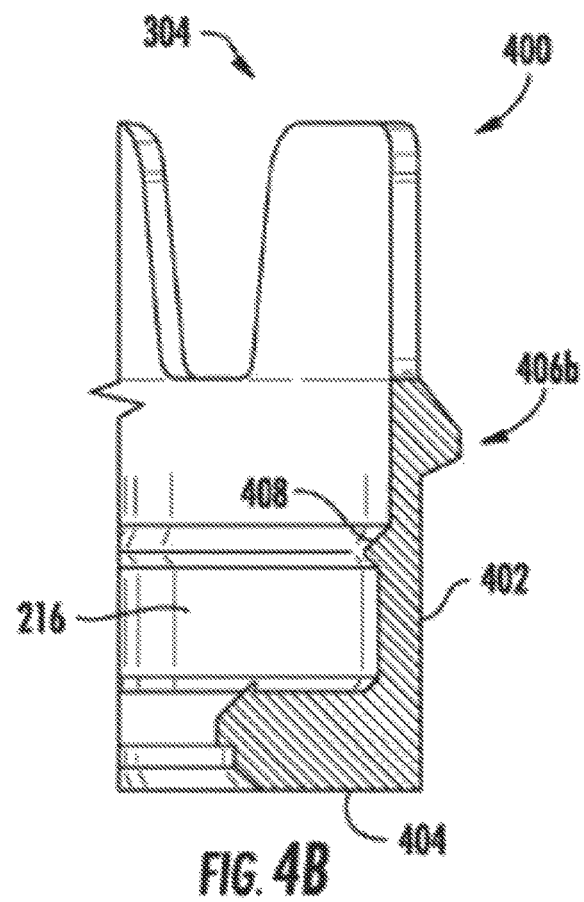
FIG. 4B illustrates another example of a cross section of the gasket of FIG. 3.

FIG. 4B shows another example of a cross section for a gasket. Here, the cross section 400 shows that the gasket 16 has the portions 404 and 404 and the projection 408, and that the leaves form the second periphery 304. However, the gasket here has an annular projection 406b that is on the opposite side relative to the projection 408. The protrusion 406b can have a polygonal or rounded shape, to name just two examples. For example, the projection 408b can help keep the crimped portion of the can (e.g., the shoulder) planar after crimping.

FIG. 5 shows a cross section of a second example of a cell 500. One characteristic of the cell 500 compared to the first example above (e.g., FIG. 2) is that the cell 500 has a gasket 502 with an integrated insulator 504. Other components of the cell 500 not explicitly described can be identical or substantially similar to those described above. Thus, for example, the cell 500 here has the can 202, the can has the shoulder 204 and the opening 206 defined by the edge 208, the cell has the diaphragm 210 with the crimping portion 210A, the central area 210B and the score 210C, the cell has the rupture plate 212, and the gasket 502 has the leaves 218.

FIG. 5A shows a perspective view of a portion 500' of the cell in FIG. 5. During the crimping process, crimping force is applied to the gasket and the diaphragm at or near the crimping portion 210A. This force can have a component that is essentially axial in relation to the can, as schematically illustrated by arrows 506. The forces can also have a component that is essentially radial in relation to the can, as schematically illustrated by arrows 508.

Due to the crimping force (e.g., the radial arrow 508) it could happen that the insulator 504 becomes displaced from its intended position and/or deformed from its intended shape in the crimping process. However, the gasket can have one or more features that seek to reduce or eliminate the occurrence of displacement/deformation. The gasket can therefore be provided with what can be considered a shock absorbing feature. In some implementations, a curved portion can be provided between the insulator 504 and the main body of the gasket. For example, portion 510 can be used to counteract such displacement/deformation.

The insulator 504 can have a raised portion 512. For example, the raised portion can be designed to seek to ensure that there is insulation in the axial direction between the rupture plate 212 and the main part of the diaphragm 210. As another example, the raised portion can be designed to seek to ensure that there is insulation in the radial direction between the rupture plate and the crimping portion 210A.

Figure 6:
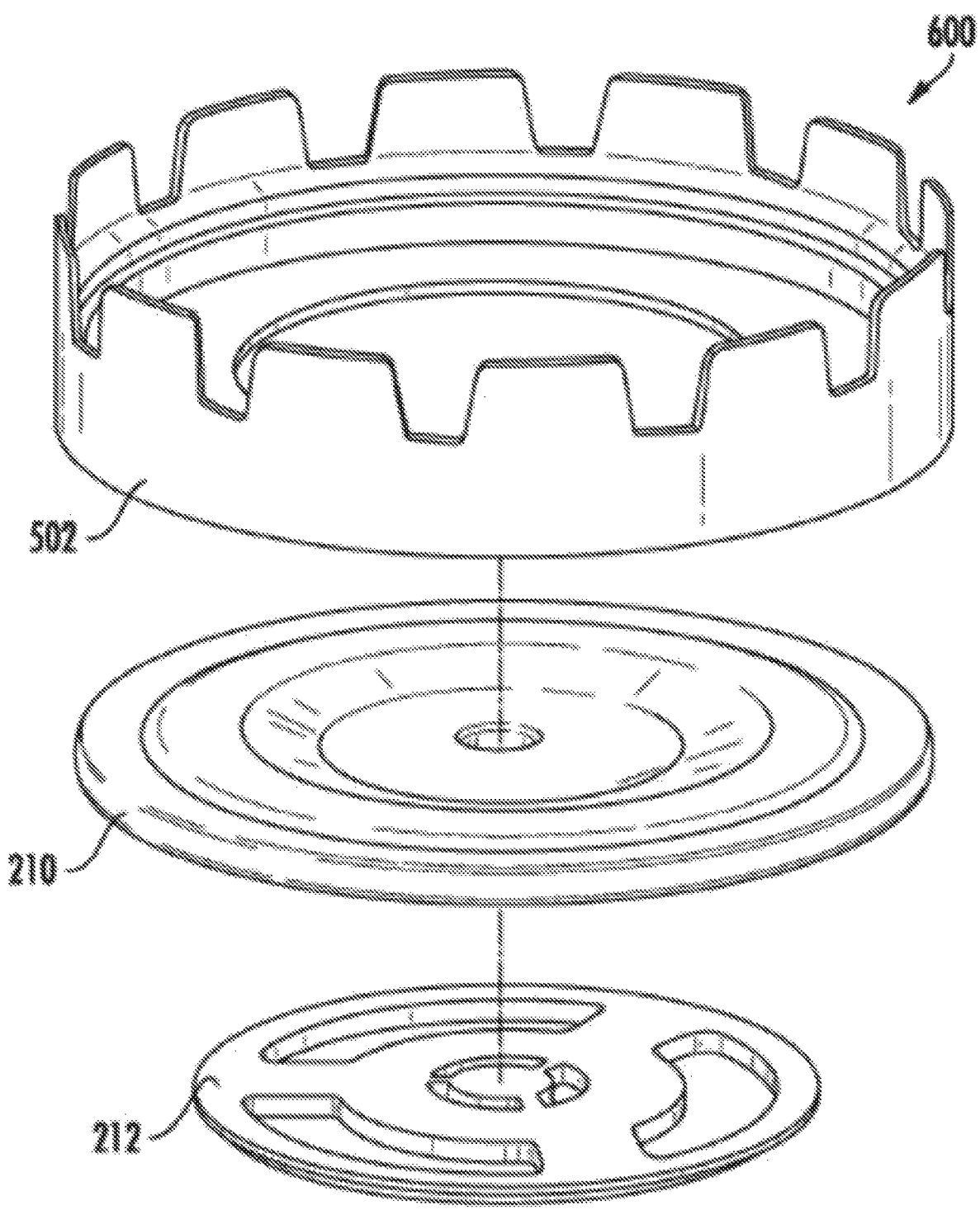
FIG. 6 illustrates examples of components of the cell of FIG. 5.

FIG. 6 shows examples of components 600 for the cell in FIG. 5. Here, the components include the gasket 502 that has the insulator integrated therein, the diaphragm 210 and the rupture plate 212. Accordingly, in this example no separate insulator is shown. Similar to what was mentioned above regarding FIG. 3, the gasket 502 can here be the lowermost of these three components and the two other elements (210, 212) can then be inserted into the gasket from above.

Figure 7:
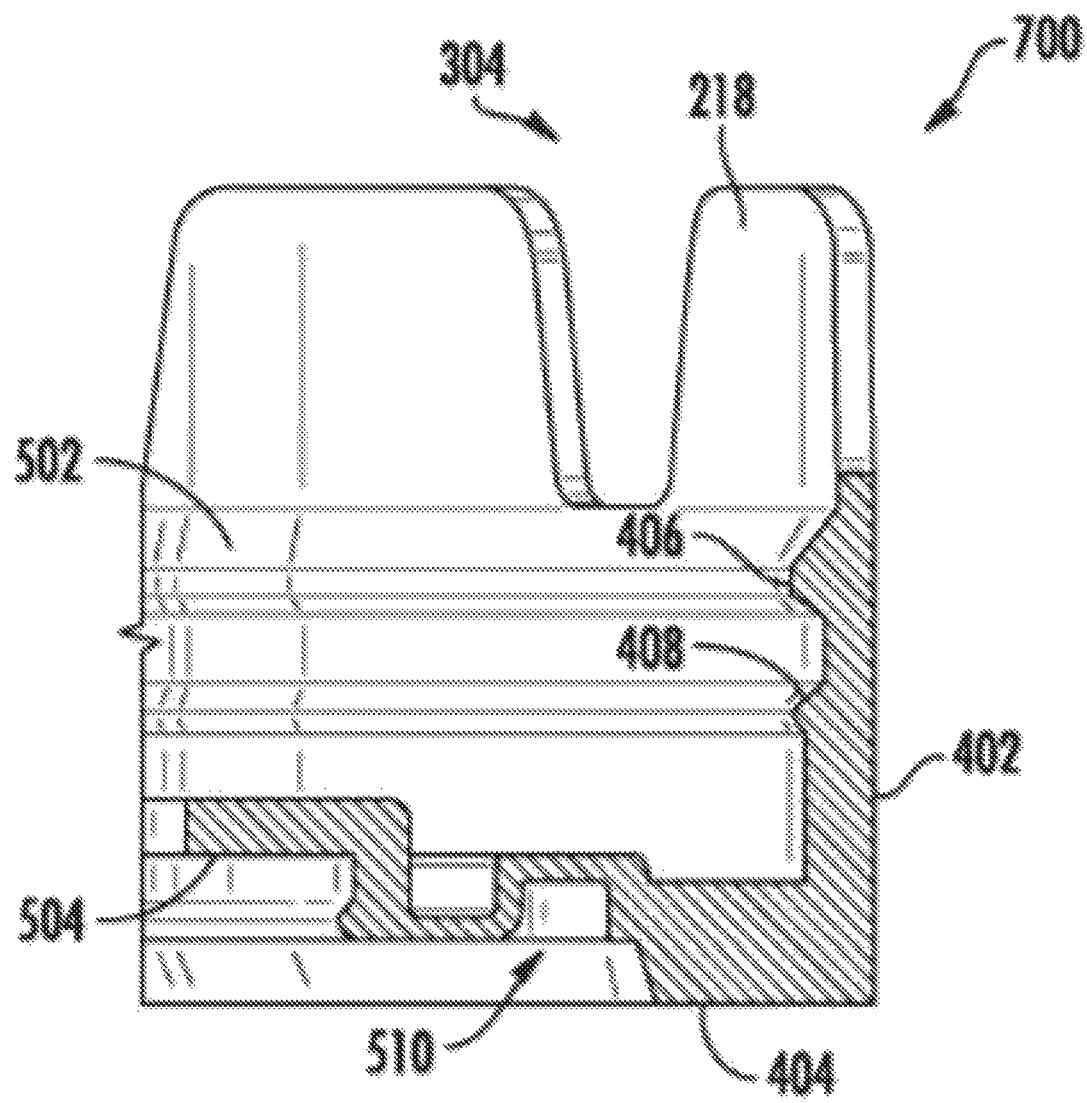
FIG. 7 illustrates a cross section of the gasket of FIG. 6.

FIG. 7 shows a cross section 700 of the gasket 502 in FIG. 6. Some aspects of the gasket not explicitly described can be identical or substantially similar to those described above. Thus, for example, the gasket 502 here has the periphery 304, the leaves 218, the projections 406 and 408, and the main portions 402 and 404. In addition, the gasket here has the portion 510 and the raised portion 512.

Figure 8:
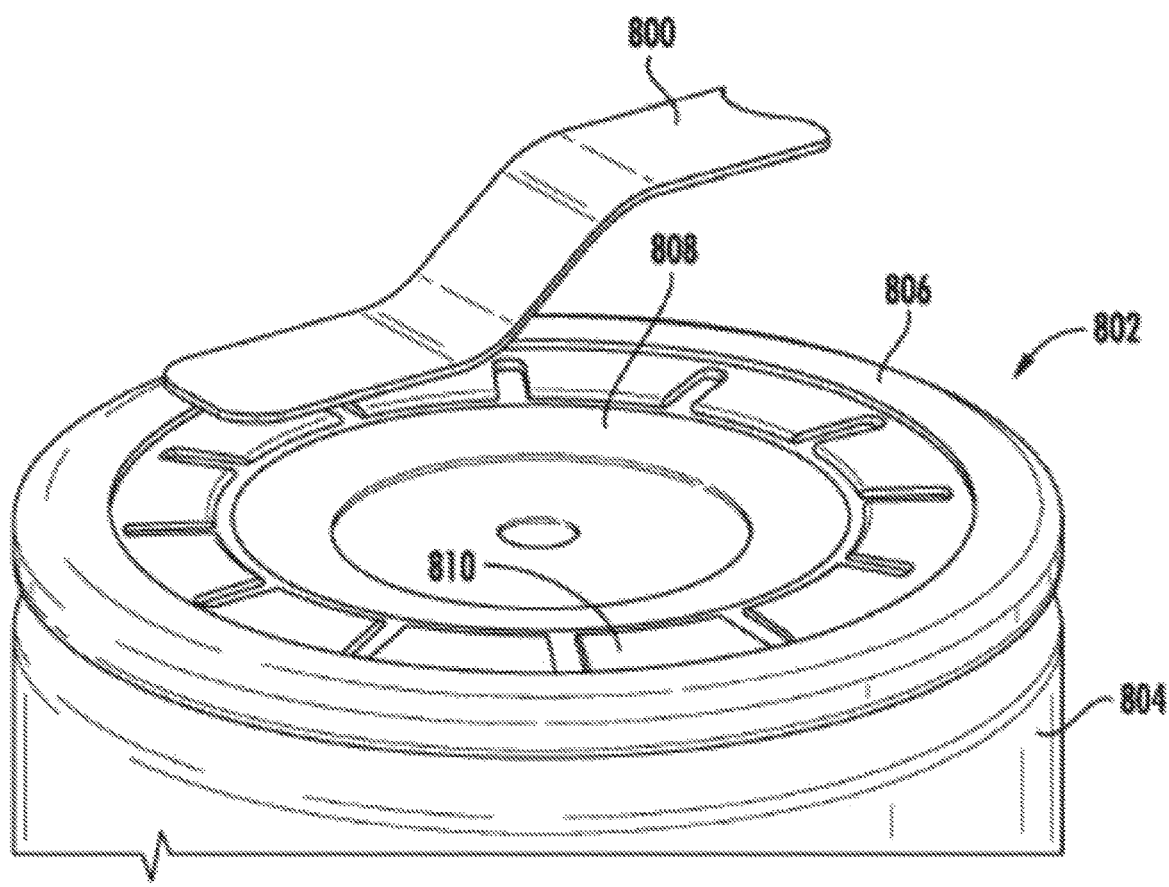
FIG. 8 illustrates an example of an electrical interconnect of the cell of FIG. 1.

FIG. 8 shows an example of an electrical interconnect 800 for a cell 802. The cell 802 includes a cap with a gasket that has the leaves 106. In some implementations, the gasket has an integrated insulator (e.g., like in the cell 500 in FIG. 5), and in other implementations the gasket does not have an integrated insulator (e.g., like in the cell 200 in FIG. 2). The cell 802 has a can 804 with a shoulder 806 former thereon. The can 804 serves as one of the electrical terminals for the cell 802 (e.g., the negative one). The cell 802 also has a diaphragm 808 that serves as the other electrical terminal (e.g., the positive one). The cell 802 has a gasket with leaves 810 extending onto the diaphragm.

FIG. 8 illustrates an example of a construct where the electrical interconnects for a cell are formed nearby each other on the cell, as opposed to, say, on opposite ends of a cylindrical cell. In some implementations, many cells are grouped in a module or other housing to form a battery (sometimes referred to as a battery pack). There, respective groups of cells can be connected in series or parallel so as to provide a desired power output from the module. In the module, each cell will have its respective interconnects for electrical contact. Because there are a number of cells inside each housing, and many housings need to be assembled (such as to meet the production demands for a particular system that uses the module), the creation of electrical interconnects can take the form of a mass manufacturing process where many thousands of interconnects (or more) are to be created, ideally during a short time. It may be preferable to automate at least part of the process, such as by robotic welding. In that situation, for example, it can be advantageous if the respective electric terminals are created near each other on the cell, and possibly on the same side thereof.

For example, in the cell 802 it is advantageous to create the electrical interconnect 800 on or near the shoulder 806, whereas another interconnect (not shown) will be created on the diaphragm 808. However, it is possible that the interconnect 800 as mounted on the shoulder will be near the diaphragm (i.e., the opposite electrical terminal). This can increase the risk for short circuits. The cap of the cell 802 is therefore provided with the gasket that has the leaves 810. The leaves 810 extend along the surface of the diaphragm 808 and therefore separate the interconnect 800 from the opposite electrical terminal. For example, this can reduce the possibility of short circuits. As another example, this can make it possible to apply different types of mass assembly techniques than would be possible otherwise.

The size and shape of the interconnect 800 are given as examples only. In some implementations a different type of interconnect can be used. The diaphragm can have an interconnect of the same type as, or different from, the interconnect 800.

Figure 9:
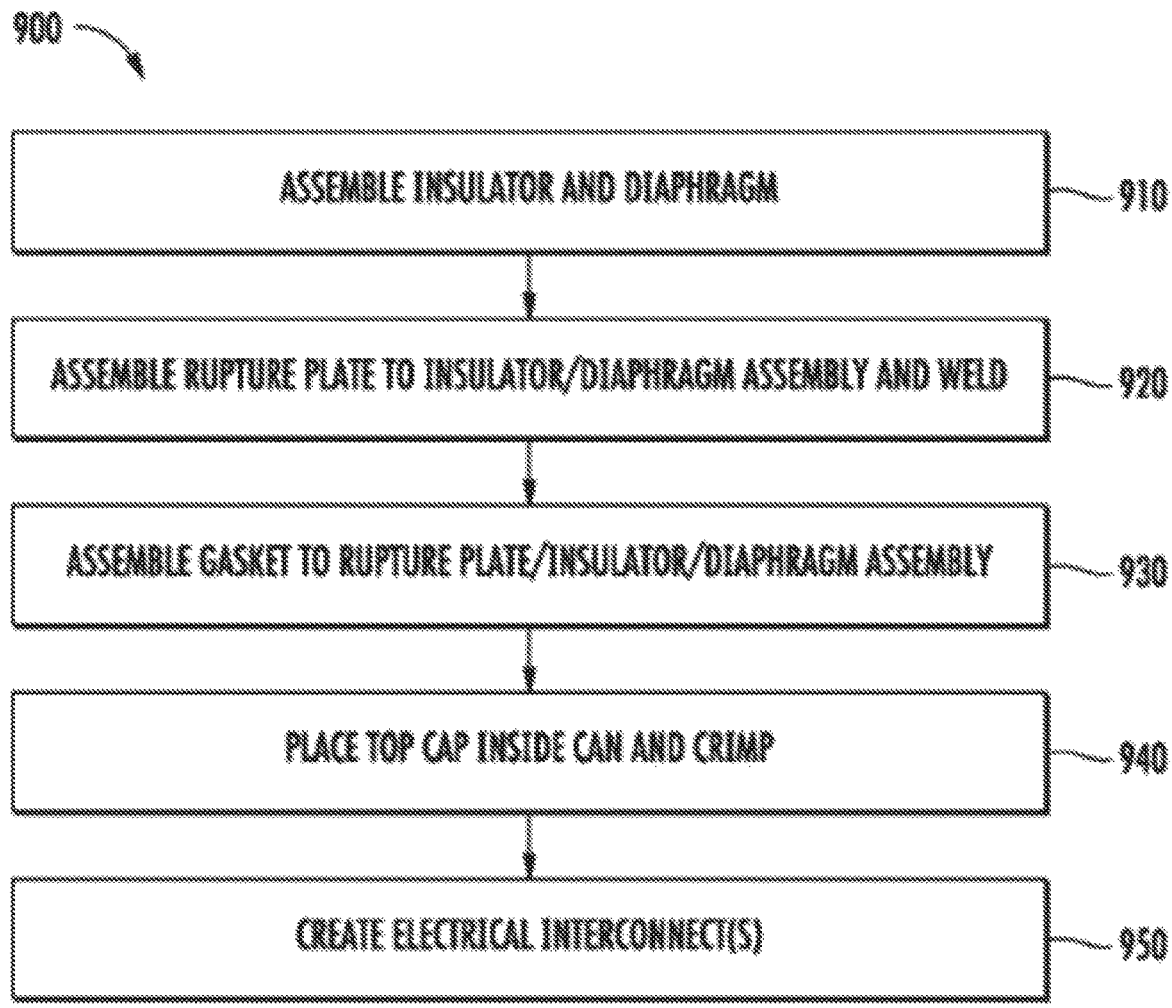
FIG. 9 illustrates a flowchart of a method for constructing a cell.

FIG. 9 shows a flowchart of an example of a method 900. First, the example of a gasket that does not have an integrated insulator (e.g., like in the cell 200 in FIG. 2) will be addressed. At 910, the insulator and diaphragm are assembled together. Any suitable technique can be used, including, but not limited to, applying an adhesive. At 920, a rupture plate is assembled to the insulator/diaphragm assembly. Any suitable technique can be used, including, but not limited to, welding or applying an adhesive. At 930, a gasket is assembled to the rupture plate/insulator/diaphragm assembly. Any suitable technique can be used, including, but not limited to, that the previous assembly fits closely inside the gasket and thereby is held in place. The assembly in this step can produce what is sometimes referred to as the cap of the cell.

At 940, the cap is placed inside an opening of the can (e.g., a top opening, hence the term top cap). The can with its cap is then crimped to fixate the cap on the can and seal the cell. The crimping may create a shoulder on the can. At 950, at least one electrical interconnect is created on the cell. This may involve creating an interconnect on a shoulder of the cell near the diaphragm. In some implementations, the interconnect is welded onto the can. For example, laser welding can be used.

In other implementations, the steps can be modified accordingly. For example, if no separate insulator is to be used, step 910 can be omitted. On the other hand, if an insulator is integrated with the gasket then another step can be altered to also accomplish proposer positioning of the integrated insulator relative to other components. Or as another example, such an operation can be a separate step among the others. The operations can be performed manually and/or by automated operation (e.g., by robotic manipulation).

Some steps that are sometimes necessary in cell manufacturing have been omitted above for clarity. For example, a method can include one or more of: preparing active materials (e.g., a jelly roll); providing bottom insulation on the jelly roll; inserting the jelly roll into the can; providing top insulation; grooving the can; creating a negative electrical connector between the jelly roll and the can; adjusting the length of the electrical connector; adding electrolyte into the can; performing an initial charge; cleaning the can; measuring cell weight and if necessary adjusting the amount of electrolyte; painting a sealing material onto the can opening; creating an electrical connection between the cap and the jelly roll; performing a pre-crimping step; pressure bonding the cell; and/or cleaning the assembled cell. Accordingly, a method can have more or fewer steps than shown. As another example, two or more steps can be performed in a different order.

Figure 10A:
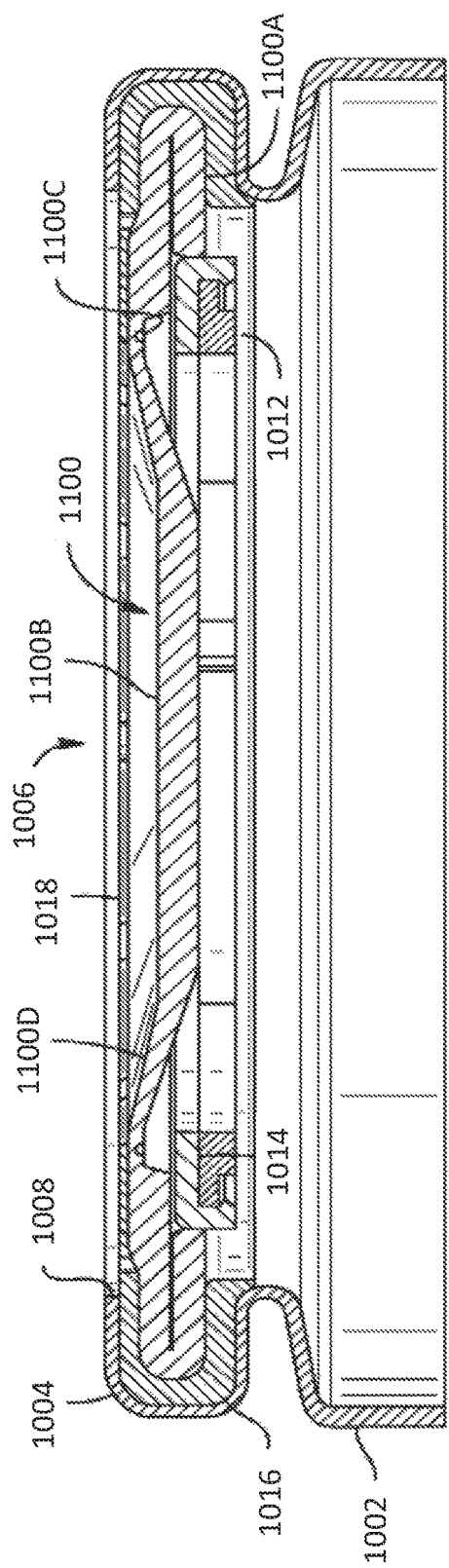
FIG. 10A illustrates a cross section of another example of a cell.

FIG. 10A shows a cross section of a first example of a cell 1000. The cell has a can 1002, only part of which is shown here for clarity, which is configured to hold therein the active materials of the cell. For example, this can include a so-called jelly roll of anode and cathode substrates, and a liquid electrolyte. The can 1002 may have any suitable shape, including, but not limited to, a cylinder shape. The can 1002 may be intended to serve as one of the electrical terminals, e.g., the negative one—for the cell.

The can 1002 has a shoulder 1004 near one of its ends. In some implementations, the shoulder 1004 is created as part of crimping the end of the cell in order to seal off the inside of the cell from the outside. Here, an essentially circular opening 1006 exists after the crimping, the opening defined by an edge 1008 of the can material. In some implementations, the shoulder 1004 is the intended location for attachment of an electrical terminal to the cell.

The cell 1000 has a diaphragm 1100, such as an essentially circular element. In some implementations, the diaphragm has a crimping portion 1100A, a central area 1100B, a score 1100C that extends at least partially around the diaphragm, and a thinner portion 1100D between the central area and the crimping portion. The diaphragm 1100 can serve one or more purposes for cell operation. First, as mentioned, the diaphragm 1100 can be part of an electrical terminal for the cell. For example, when the can 1002 serves as the negative terminal, the diaphragm 1100 can be the positive electrical terminal. Second, the diaphragm 1100 may serve to close off the can 1002 interior to prevent leakage and contamination. Third, in the event of increasing internal pressure the diaphragm 1100 can pop up and thereby facilitate a CID operation. Fourth, if pressure inside the can 1002 rises above a threshold, which occurs, e.g., in the event of an unwanted reaction in the cell, such as a thermal runaway—the diaphragm can rupture and thereby allow fluid to escape out of the cell, essentially facilitating ventilation of the cell. For example, the score 1100C or another material weakening can facilitate rupturing of the diaphragm.

The cell has a rupture plate 1012 that can be attached directly to the diaphragm. The rupture plate 1012 can serve one or more purposes in facilitating rupturing of the diaphragm 1100. For example, the rupture plate 1012 can control the load that bears on the inside of the diaphragm 1100 during rising pressure and thereby control when rupturing occurs and the pattern of the rupturing. The cell here has an insulator 1014 positioned at least partly in between the rupture plate 1012 and the diaphragm 1100. In some implementations, the insulator 1014 can be an essentially circular element.

The cell has a gasket 1016 that serves to hold the cap in place, seal in the contents of the can 1002, and reduce or eliminate short circuiting during the manufacturing process. For example, the gasket 1016 is sealing between the diaphragm 1100 and an opening of the can 1002. The gasket 1016 has a number of leaves 1108 that currently—i.e., after crimping are positioned on top of the diaphragm 210.

Figure 10B:
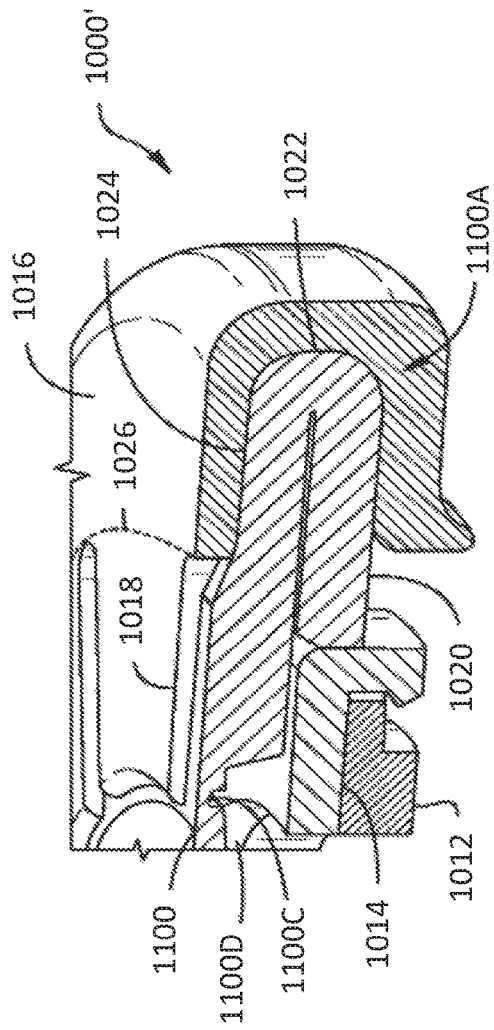
FIG. 10B illustrates a perspective view of a portion of the cell of FIG. 10.

FIG. 10B shows a perspective view of a portion 1000' of the cell 1000 in FIG. 10A. Here, the can 1002 has been omitted for clarity. As such, the illustration shows the gasket 1016 covering the crimping portion 1100A of the diaphragm 1100; the leaf 1108 extending over part of the upper surface of the diaphragm 1100; and the insulator 1014 between the diaphragm 1100 and the rupture plate 1012. The crimping portion 1100A can include a folded back portion that essentially doubles the thickness of the diaphragm 1100 in that place. Here, the crimping portion 1100A includes a fold 1020, a turn 1022 and a fold backing 1024. For example, this increased thickness can serve to make the crimping and/or sealing more effective. At the same time, the rest of the diaphragm, which nominally has half the thickness of the folded back portion—does not unduly complicate the formation of other features on the diaphragm, such as the score 1100C or the thinner portion 1100D.

Here, the turn 1022 is created by folding the fold 1020, which was originally the diaphragm's outer periphery away from the outer surface of the diaphragm (e.g., the folding is done downward, meaning toward where the interior of the can will be located). In other implementations, however, the diaphragm 1100 can instead be folded in the opposite direction, such that the fold 1020 is positioned on the upper part of the diaphragm 1100.

In some implementations, the gasket 1016 has the leaves 1018 that after installation extend partially across the diaphragm 1100. For example, in implementations where an electrical interconnect is attached to the shoulder of the can, the leaves 1018 may prevent or reduce short circuits between that interconnect and the diaphragm. In other implementations, however, the gasket has no leaves. A line 1026 schematically illustrates where the gasket 1016 can then end on the outer surface of the diaphragm 1100. For example, this gasket 1100 can be used in implementations where the electrical interconnect is not mounted on the shoulder on the can but rather elsewhere on the housing (e.g., at the bottom of a cylindrical can).

Figure 11:
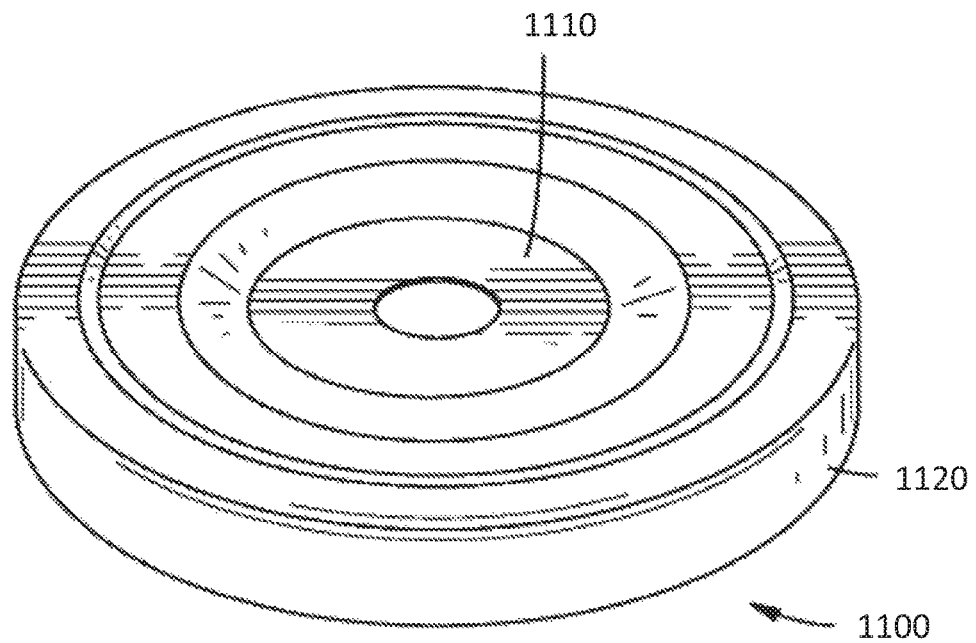
FIG. 11 illustrates a perspective view of an example of a diaphragm during manufacturing.

FIG. 11 shows a perspective view of an example of a diaphragm 1100 during manufacturing. The diaphragm has an upper surface 1110 that is provided with one or more features. In some implementations, the diaphragm 1100 initially has an even thickness and is then thinned in one or more areas. For example, the diaphragm 1100 may be stamped to have a tapering profile, such as to facilitate a popup operation for CID operation. As another example, one or more scores can be formed, such as to facilitate venting by allowing the diaphragm to rupture.

The diaphragm also has a surface 1120 that is currently oriented at essentially a right angle to the upper surface. The diaphragm may initially have been a plane disc, and the surface 1120 was then folded into its current position at an intermediate stage. For example, the current orientation of the surface 1120 can be useful in handling or processing the diaphragm, such as when holding the diaphragm to perform stamping and/or scoring.

Figure 12:
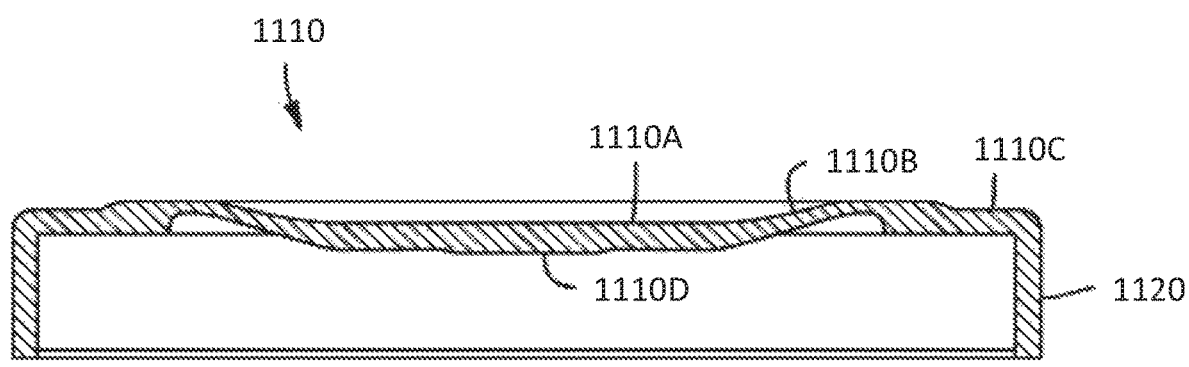
FIG. 12 illustrates a cross section of the diaphragm of FIG. 11.

FIG. 12 shows a cross section of the diaphragm 1100 in FIG. 11. The upper surface 1110 here includes a plane center portion 1110A, a tapered section 1110B, a fold backing 1110C, and an inner surface 1110D. For example, part of the surface 1120 can later be folded toward the fold backing 1110C.

Figure 13:
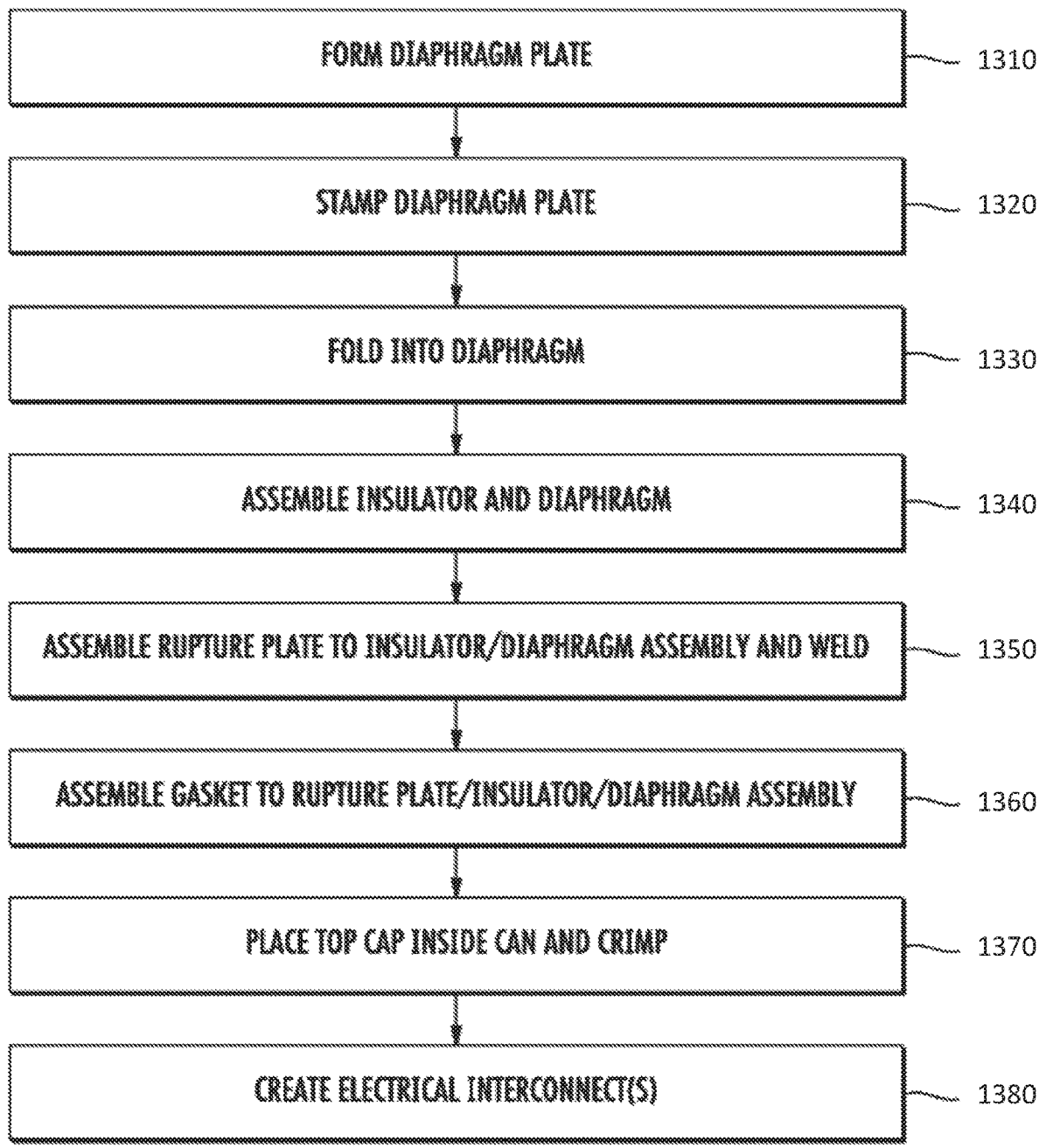
FIG. 13 illustrates a flowchart of another method for constructing a cell.

FIG. 13 shows a flowchart of an example of a method. At 1310, a diaphragm plate is formed, e.g., a blank is cut from a sheet of metal (e.g., aluminum). At 1320, the diaphragm plate is stamped into a desired shape. In one embodiment, the tapered section 1110B (FIG. 12) and/or the score 1100C (FIGS. 10A and 10B) are created. The diaphragm may have its initial shape when performing the operation(s) at 1320, or it may have been prepared in some way, such as by folding the surface 1120 (FIG. 11). At 1330, the diaphragm is folded into its final shape. For example, the fold 1020 (FIG. 10B) can be folded toward the fold backing 1024 so as to create the turn 1022. At 1340, the insulator and diaphragm are assembled together. Any suitable technique can be used, including, but not limited to, applying an adhesive.

At 1350, a rupture plate is assembled to the insulator/diaphragm assembly. Any suitable technique can be used, including, but not limited to, welding or applying an adhesive. At 1360, a gasket is assembled to the rupture plate/insulator/diaphragm assembly. Any suitable technique can be used, including, but not limited to, that the previous assembly fits closely inside the gasket and thereby is held in place. The assembly in this step can produce what is sometimes referred to as the cap of the cell.

At 1370, the cap is placed inside an opening of the can (e.g., a top opening, hence the term top cap). The can with its cap is then crimped to fixate the cap on the can and seal the cell. The crimping may create a shoulder on the can. For example, the thickness created by the folding of the outer periphery toward the center of the cell.

At 1380, at least one electrical interconnect is created on the cell. This can involve creating an interconnect on a shoulder of the cell near the diaphragm. In some implementations, the interconnect is welded onto the can. For example, laser welding can be used.

In other implementations, the steps can be modified accordingly. For example, if no separate insulator is to be used, step 1340 can be omitted. On the other hand, if an insulator is integrated with the gasket then another step can be altered to also accomplish proposer positioning of the integrated insulator relative to other components. Or as another example, such an operation can be a separate step among the others. The operations can be performed manually and/or by automated operation (e.g., by robotic manipulation).

Some steps that are sometimes necessary in cell manufacturing have been omitted above for clarity. For example, a method can include one or more of: preparing active materials (e.g., a jelly roll); providing bottom insulation on the jelly roll; inserting the jelly roll into the can; providing top insulation; grooving the can; creating a negative electrical connector between the jelly roll and the can; adjusting the length of the electrical connector; adding electrolyte into the can; performing an initial charge; cleaning the can; measuring cell weight and if necessary adjusting the amount of electrolyte; painting a sealing material onto the can opening; creating an electrical connection between the cap and the jelly roll; performing a pre-crimping step; pressure bonding the cell; and/or cleaning the assembled cell. Accordingly, a method can have more or fewer steps than shown. As another example, two or more steps can be performed in a different order. A number of implementations have been described as examples.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An electrochemical cell comprising:
    a can configured to serve as one electric contact of the electrochemical cell, the can containing active materials;
    a diaphragm configured to serve as an opposite electric contact of the electrochemical cell, the diaphragm having an outer surface, and an outer edge;
    a gasket crimped to the can, the gasket comprising:
        an inner periphery positioned about the outer edge of the diaphragm and inside the can; and
        an outer periphery positioned outside the can, the outer periphery comprising slotted leaves extending along an outer surface of the diaphragm.

2. The electrochemical cell of claim 1, wherein the slotted leaves lie essentially flat against the outer surface of the diaphragm.

3. The electrochemical cell of claim 1, wherein the slotted leaves are equidistantly spaced along the outer periphery.

4. The electrochemical cell of claim 1, wherein the slotted leaves are shaped so that adjacent slotted leaves are separated by a slot formed by substantially parallel edges.

5. The electrochemical cell of claim 1, wherein side edges of the slotted leaves are each slanted inward toward a top edge of the slotted leaves.

6. The electrochemical cell of claim 1, wherein, in an undeformed state of the gasket, a top edge of each slotted leaf is essentially parallel to the inner periphery.

7. The electrochemical cell of claim 1, further comprising a first annular projection on the gasket, the first annular projection is positioned closer to the outer periphery and above a second annular projection configured to hold the diaphragm.

8. The electrochemical cell of claim 7, wherein the first annular projection faces inward on the gasket.

9. The electrochemical cell of claim 7, wherein the first annular projection faces outward on the gasket.

10. The electrochemical cell of claim 1, further comprising a rupture plate inside the can, and an insulator between the rupture plate and the diaphragm.

11. The electrochemical cell of claim 10, wherein the insulator is integral with the gasket.

12. The electrochemical cell of claim 11, further comprising a curved portion between the insulator and a main body of the gasket.

13. The electrochemical cell of claim 11, further comprising a raised portion on the insulator that fits inside a recessed portion of the diaphragm.

14. An electrochemical cell comprising:
    a can configured to serve as one electric contact of the electrochemical cell, the can containing active materials;

a diaphragm configured to serve as an opposite electric contact of the electrochemical cell; and means for sealing between the diaphragm and an opening of the can, and for protecting against short circuiting during interconnect welding, wherein a gasket is crimped to the can, the gasket comprising:
    an inner periphery positioned about the outer edge of the diaphragm and inside the can; and
    an outer periphery positioned outside the can, the outer periphery comprising slotted leaves extending along an outer surface of the diaphragm.

\* \* \* \* \*